Oct. 20, 1970  J. H. PORTER  3,534,528
GAS WELL SULFUR REMOVAL BY DIFFUSION THROUGH POLYMERIC MEMBRANES
Filed May 26, 1969
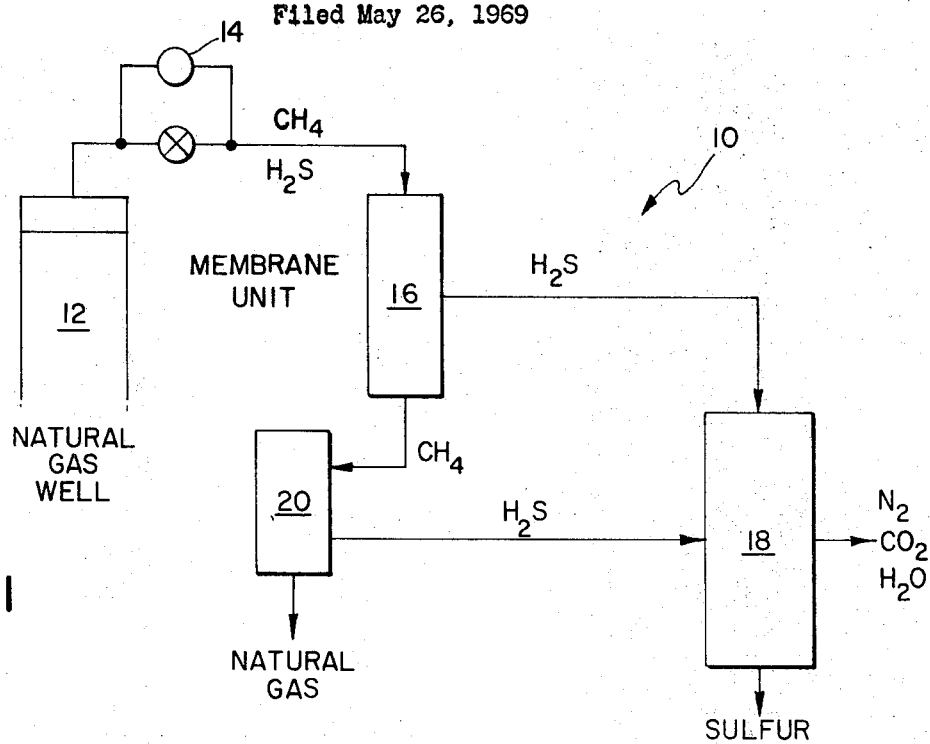
FIG. 1
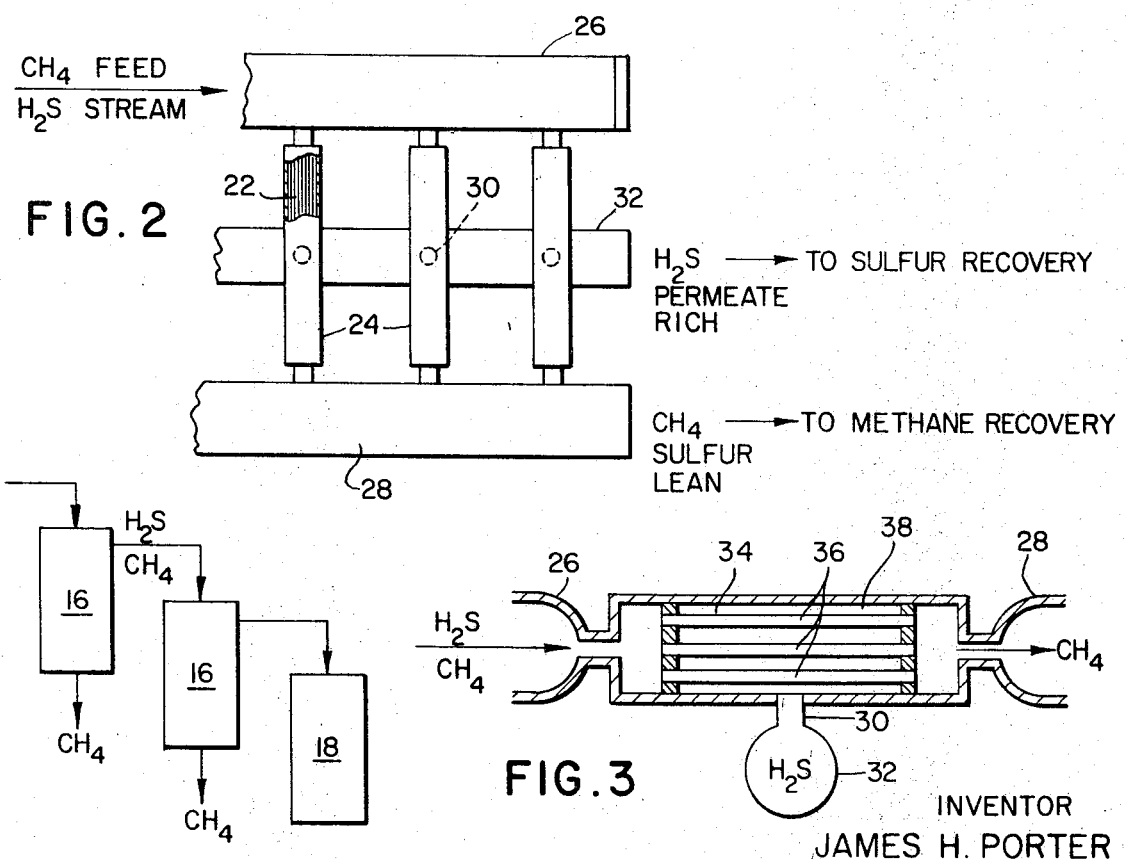
FIG. 2
FIG. 3
FIG. 4
INVENTOR
JAMES H. PORTER
BY
Crowley, Kiely & Stevens
ATTORNEY

United States Patent Office 3,534,528
Patented Oct. 20, 1970

3,534,528
GAS WELL SULFUR REMOVAL BY DIFFUSION THROUGH POLYMERIC MEMBRANES
James H. Porter, Boston, Mass., assignor to Abcor, Inc., Cambridge, Mass., a corporation of Massachusetts
Filed May 26, 1969, Ser. No. 827,511
Int. Cl. B01d *59/10*
U.S. Cl. 55—16    7 Claims

ABSTRACT OF THE DISCLOSURE

A method of separating hydrogen sulfide as a gaseous contaminant from a natural gas stream, a major portion of which comprises methane. The gas from a natural gas well flows under pressure into the feed zone of a membrane permeation unit comprised of capillary silicone-copolymer fibers. The hydrogen sulfide permeates through the membrane into the permeate rich zone. The partial pressure or activity gradient required to drive the hydrogen sulfide through the membrane is provided by the naturally occurring pressure of the well. The sulfur is recovered from the permeate rich stream and the methane is recovered from the sulfur lean stream.

SUMMARY OF THE INVENTION

There are a number of natural gas wells which are not in production because of their high sulfur content (2 to 40% hydrogen sulfide). These wells generally remain capped off until it is economical to remove the sulfur from the hydrocarbon streams. Present techniques for removing the sulfur, particularly hydrogen sulfide, consist mainly of absorption of the hydrogen sulfide in mono-ethanol-amine in a scrubbing application. Typically, for every mole of hydrogen sulfide removed from the hydrocarbon stream, approximately 2.9 moles of mono-ethanol-amine must be fed to the scrubber. With very high sulfur contents in the natural gas, this process generally becomes uneconomical.

One major cost associated with gas permeation processes is usually compressing the feed stream to a sufficient operating pressure to cause an activity (partial pressure) gradient across the polymer film for the permeating species.

In my invention, the sulfur portion of the hydrocarbon stream passes through a polymer membrane which selectively passes the hydrogen sulfide in preference to the hydrocarbons. The permeator may be constructed in a manner similar to a shell and tube heat exchanger with the tubes in this case being hollow capillary fibers made of a suitable polymer material. Since gas wells normally exist at pressures from 500 to 17,000 pounds per square inch, this pressure is supplied essentially free of cost and, hence, makes gas permeation a feasible process. The operating pressure for the membrane permeation unit is provided by the naturally occurring pressure in the gas well providing an economic and efficient method.

BRIEF DESCRIPTION OF THE DRAWINGS

FIG. 1 is a schematic flow diagram of the process of my invention, and

FIGS. 2 and 3 are enlarged sectional views of the membrane separation unit, and

FIG. 4 is an alternative embodiment of my invention.

DESCRIPTION OF THE PREFERRED EMBODIMENT(S)

Referring to FIG. 1, the system is shown generally at 10 and comprises a natural gas well 12 which has been capped and which well may be under a naturally occurring pressure at between 500 and 17,000 pounds per square inch. A pressure reducing valve 14 is disposed between the well 12 and a membrane permeation unit 16. The reducing valve regulates and maintains a constant pressure on the feed stream entering the permeation unit. The permeate or hydrogen-sulfide rich stream flows to a sulfur recovery unit 18 and the sulfur-lean or methane-rich stream flows to a methane recovery unit 20.

Referring to FIGS. 2 and 3, the permeation unit 16 is shown in greater detail. In FIG. 2, capillary bundles 22 of silicone-copolymer fibers such as poly-dimethyl-siloxane are contained within tubes 24, which tubes are in a generally parallel relationship. One end of each tube is connected to a feed conduit or header 26 which carries the feed stream from the natural gas well. The other end of the tube is connected to a sulfur-lean conduit 28, which conduit is in fluid flow communication with the methane recovery unit 20. Located on the surface of the tube 24 is a nipple 30 which is connected to a permeate-rich conduit 32. The permeate rich conduit is in fluid flow communication with the sulfur-recovery unit 18. Referring now to FIG. 3, the capillary fibers 34 are disposed within the tube 24 as a bundle 22, the ends of the bundle being potted in a suitable potting compound. The feed stream flows into the feed zone 36 which is defined by the internal walls of the capillary fibers. The hydrogen sulfide permeates through the walls of the membrane and into the permeate-rich zone 38, which is defined by the external surfaces of the fibers and the internal wall of the tube. Of course, if desired, the feed stream may be introduced into the zone defined by the external surfaces of the fibers and the internal wall of the tube, and then the hydrogen sulfide would permeate through the membrane into the zone defined by the internal walls of the capillary fibers.

In the operation of my invention, the feed stream flows from a natural gas well which has been capped and is under a pressure of about 3,000 pounds per square inch. The gaseous feed stream contains many constituents such as hydrocarbons in the $C_1-C_8$ range, for example, methane, ethane, butane, isobutane, propane, etc.; carbon dioxide, nitrogen, and sulfur-containing gaseous contaminants in various forms such as hydrogen sulfide and sulfur-hydrogen contaminants such as mercaptans. For the purposes of describing the preferred embodiment, the feed stream comprises from between 98 to 55% methane, say 70% methane from between 2% and 45% hydrogen sulfide, say 30% hydrogen sulfide. It is to be understood that my invention may also be used for the separation of other gaseous constituents from hydrocarbon streams, such as nitrogen, hydrogen, carbon dioxide, or any chemical species having a different permeability than the hydrocarbons.

The feed stream, which comprises 70% methane and 30% hydrogen sulfide, flows through the reducing valve 14 and into the feed zone 36 of the membrane permeation unit at a pressure of about 2,000 per square inch. Within the bundle 22 there are typically tens of thousands of silicone-copolymer fibers and the number of bundles in the permeation unit may range from several hundred to tens of thousands depending, of course, on the process requirements. The individual fibers may be from a few inches to several feet long, say, for example, about four feet, and the wall thickness may range from fractions of a mil to several mils. In the preferred embodiment, the inside diameter of the fiber is about 1 mil and the outside diameter is about 2 mils. The capillary fibers are uniquely suited for my invention since the geometry of the fibers provides a much greater surface area and structural strength as compared to flat membrane sheets. However, if desired, the capillary fibers may be woven or wound about a mandril having a plurality of flow passages therein. Further, flat reinforced membrane sheets capable of withstanding the pressures involved may be used.

The activity (partial pressure) gradient across the polymer film is provided by naturally occurring pressure of the gas well. The hydrogen sulfide within the feed zone diffuses through the capillary walls and into the permeate-rich zone 38 and through the conduit 32 and to the sulfur recovery unit 18. The permeate-rich stream generally comprises 45% to 65% hydrogen sulfide, say, for example, about 55%.

The sulfur in the permeate-rich stream flows to the sulfur recovery unit where the sulfur may be recovered by any of several sulfur recovery processes such as the Claus process wherein a portion of the $H_2S$ is oxidized and converted to $SO_2$ and the sulfur dioxide eventually converted to free sulfur. If desired, the permeate-rich stream may be processed through one or more membrane stages prior to flowing to the sulfur recovery unit as shown in FIG. 4. The methane-rich or sulfur-lean stream flows into conduit 28 and then to the methane recovery unit 20. The stream generally comprises 0.5% to 8% hydrogen sulfide, say, for example, about 2%. The small amounts of hydrogen sulfide left in the methane may be removed by absorption with mono-ethanol-amine.

Although my invention has been described in reference to the separation of hydrogen sulfide using a poly-dimethyl-siloxane membrane, many membranes including polymeric membranes may be used to effectuate similar separations with my invention such as: $C_2$–$C_4$ polyolefins such as polyethylene and polypropylene; polyamides such as nylon; acrylic resins; polar membranes such as acrylates; rubbers as Neoprene, chloroprene, butyl rubber, etc.; and other natural and synthetic elastomers, and cellulose derivatives such cellulose ethers and esters. Also other silicone-copolymer membranes other than the one described in the preferred embodiment may be used, for example, silicone rubber membranes such as the homopolymeric dialkylsiloxanes and copolymers of dialkylsiloxane and siloxanes of the type RR'SiO where R is a monocyclic aryl radical and R' is alkyl or monocyclic aryl. The alkyl group may include other silicone-bonded groups like vinyl, phenyl, ethyl etc., organic groups.

Generally, the membrane selected will depend upon operating conditions and the particular component in the gaseous stream to be separated and its solubility in the membrane.

In other embodiments, the membrane unit 16 may be placed upstream of a process employing catalysts such as metal catalysts; for example, platinum, rhodium, etc., to remove the sulfur, which would normally contaminate the catalyst, from the process stream. Also, it may be successfully used to remove sulfur from other process streams to prevent corrosion and to inhibit air pollution. Also, it may be used in fuel processing to lower the sulfur amounts and thus reduce the amount of antiknock additive required to negate the effect of the sulfur contaminant.

Having described my invention, what I now claim is:

1. A method of separating hydrogen sulfide from a naturally occurring high pressure source of a gaseous stream containing methane, which comprises:
 (a) providing a membrane device having a feed zone for the introduction of the gaseous stream, a semipermeable membrane material comprising silicone-copolymer or olefinic resin capillary fibers which are capable of separating the methane from the hydrogen sulfide, and a permeate-rich zone for the recovery of the hydrogen sulfide;
 (b) introducing the high pressure gaseous stream comprising 55% to 98% methane and 2% to 45% hydrogen sulfide into the feed zone of the membrane device between 500 and 3,000 pounds per square inch;
 (c) diffusing a portion of the hydrogen sulfide through the membrane into the permeate-rich zone;
 (d) withdrawing the permeate-rich stream from the membrane device;
 (e) recovering the sulfur from the permeate-rich stream; and
 (f) withdrawing a methane permeate-lean stream from the membrane device.

2. The method of claim 1 wherein the silicone copolymer is polydimethylsiloxane and its copolymers.

3. The method of claim 1 wherein the membrane device comprises a series of staged membrane devices wherein the permeate-rich stream is processed through one or more membrane stages prior to recovering the sulfur from the permeate-rich stream.

4. The method of claim 1 wherein the small amount of hydrogen sulfide left in the permeate-lean membrane stream is removed by absorption with monoethanol amine.

5. The method of claim 1 wherein the permeate-lean stream is employed in a process involving metal catalysts, which catalysts would normally be contaminated by the sulfur in the feed stream.

6. The method of claim 1 which includes recovering the methane from the permeate-lean methane stream.

7. The method of claim 1 wherein the olefinic resin is polyethylene or polypropylene.

References Cited
UNITED STATES PATENTS

| | | | |
|---|---|---|---|
| 2,617,493 | 11/1952 | Jones | 55—16 |
| 2,966,235 | 12/1960 | Kammermeyer | 55—16 |
| 3,228,877 | 1/1966 | Mahon | 55—158 |
| 3,274,750 | 9/1966 | Robb | 55—16 |

REUBEN FRIEDMAN, Primary Examiner

C. N. HART, Assistant Examiner

U.S. Cl. X.R.

55—73